United States Patent [19]
Kehl et al.

[11] Patent Number: 5,688,455
[45] Date of Patent: Nov. 18, 1997

[54] PROCESS FOR MAKING A CELLULOSE TRIACETATE PHOTOGRAPHIC FILM BASE

[75] Inventors: Randall Joseph Kehl, Churchville; Eric Eugene Arrington, Farmington, both of N.Y.

[73] Assignee: Eastman Kodak Company, Rochester, N.Y.

[21] Appl. No.: 592,910

[22] Filed: Jan. 29, 1996

[51] Int. Cl.$^6$ .............................. B29C 41/26; B29C 33/66
[52] U.S. Cl. .............. 264/169; 264/192.19; 264/207; 264/211.11
[58] Field of Search .............. 264/211.11, 217, 264/218, 207, 169, 391, 172.19; 425/131.1, 461.224, 462

[56] References Cited

U.S. PATENT DOCUMENTS

| | | | |
|---|---|---|---|
| 2,295,280 | 9/1942 | Fordyce | 18/15 |
| 2,295,394 | 9/1942 | Fordyce et al. | 18/15 |
| 5,393,476 | 2/1995 | Suzuki | 264/169 |

FOREIGN PATENT DOCUMENTS

208650/90  8/1990  Japan.

Primary Examiner—Jeffery R. Thurlow
Attorney, Agent, or Firm—Carl F. Ruoff; Robert A. Gerlach

[57] ABSTRACT

A method of making a cellulose triacetate photographic film support by forming a dope solution of cellulose triacetate in a first solvent, passing the dope solution under pressure through a sheet forming die zone having an upper and lower surface and two edge surfaces, injecting a second solvent into the dope solution at the edge surfaces within the die zone in an amount sufficient to form a slip layer at the two edge surfaces, exiting the dope solution from the sheet forming die zone and separating the solvent from the cellulose triacetate.

11 Claims, 1 Drawing Sheet

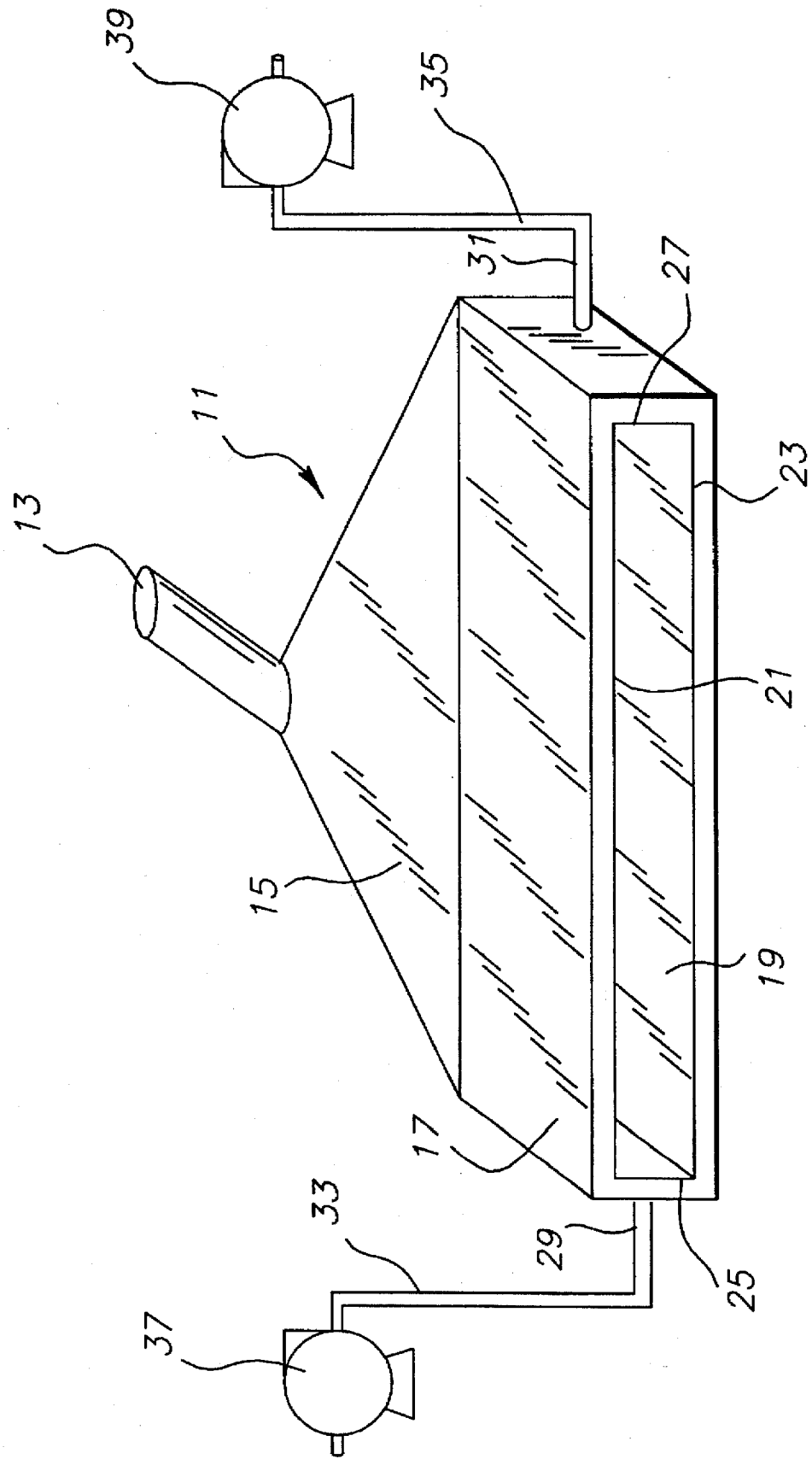

PROCESS FOR MAKING A CELLULOSE TRIACETATE PHOTOGRAPHIC FILM BASE

FIELD OF THE INVENTION

This invention relates to a process for producing cellulose triacetate photographic film base by solution casting and more particularly to a process for producing cellulose triacetate film base without defects at the edge of the web caused by casting.

BACKGROUND OF THE INVENTION

The preparation of cellulose ester film and particularly cellulose triacetate film includes the steps of forming a dope solution by dissolving cellulose triacetate in a suitable solvent such as dichloromethane. The dope traditionally has a concentration of cellulose triacetate in the solvent of from about 15 to about 35 percent by weight. The dope is filtered through one or more filtration devices, and then extruded through a die as a film which is cast onto a moving surface such as a highly polished wheel or continuous band where the dope is "cured" by evaporation of the solvents from the exposed side. The dope stays on the band or wheel long enough to allow it to build sufficient strength to separate it from the band or wheel, and it is then subsequently dried through air sections and finally wound up as a roll of film.

A problem in the art of casting cellulose triacetate dope onto the surface is the quality of the edge of the cast sheet formed by extruding the dope. At the extreme edge of the die, the dope will often adhere to the metal die material causing small tears or non-uniformities in the edge of the cast sheet. This often causes the web to tear off when the web is separated from the casting surface, or it may also cause the web to turn over on itself, causing conveyance problems later in the machine. Presently, there are several methods which attempt to reduce this problem. Japanese Patent Laid-Open 208650/90 refers to a technique where solvent is applied to the cast film. Other techniques commonly used include applying a solvent vapor to the cast edge as the dope leaves the die. There are several difficulties with these approaches. First, it is difficult to direct a liquid stream in such a way that the liquid stream uniformly covers the entire edge without dripping. Ideally, the stream should uniformly cover the edge of the dope stream as the dope exits the die. Because this is so difficult to do, differences in adhesion around the edge cause occasional non-uniformities. A similar problem exists for the delivery of a vapor stream. In order to reduce adhesion between the die lip and the top, edge and bottom of the dope stream, elaborate delivery systems must be built into the extrusion die which are extremely expensive, and cause installation difficulties. Also, because these techniques are external to the die, a sudden change in adhesion between the dope and die lip occurs, which causes flow disturbances resulting in a non uniform edge.

PROBLEM TO BE SOLVED BY THE INVENTION

As a result, there is a need for a method to prevent the dope from adhering to the metal surface of the die lip, which can be implemented in such a way as to coat the entire edge before the dope actually leaves the edge of the die lip.

SUMMARY OF THE INVENTION

The invention provides a method of making a cellulose triacetate photographic film support by forming a dope solution of cellulose triacetate in a first solvent, passing the dope solution under pressure through a sheet forming die zone having an upper and lower surface and two edge surfaces, injecting a second solvent into the dope solution at the edge surfaces, exiting the dope solution from the sheet forming die zone and separating the solvent from the cellulose triacetate. The first and second solvents may be the same or different.

Thus, the invention contemplates passing a dope solution of cellulose triacetate through a film forming die orifice while injecting a solvent for the cellulose acetate into the dope solution just prior to the dope solution exiting the die orifice.

ADVANTAGEOUS EFFECT OF THE INVENTION

The present invention achieves an increase in reliability by forming a boundary layer of liquid between the dope and the wall of the casting die.

BRIEF DESCRIPTION OF THE DRAWING

The FIGURE is a diagrammatic view of an apparatus for carrying out the process of the invention.

DESCRIPTION OF PREFERRED EMBODIMENTS

In the preparation of cellulose triacetate photographic film base in accordance with this invention, a concentrated dope solution is first prepared by mixing and dissolving cellulose triacetate and a plasticizer such as triphenyl phosphate or dibutyl pthalate in a dichloromethane solvent to which may be added other ingredients such as alcohols including ethanol, butanol, propanol, methanol, mixtures thereof, and the like, ketones including acetone, methylethyl ketone, and the like, cyclic alkanes such as cyclohexane, methylcyclohexane, cyclopentane, mixtures thereof and the like. The cellulose triacetate/plasticizer ratio is 13–17% by weight. This cellulose triacetate/plasticizer is mixed with solvents to a concentration of between 15 and 70%. The solvents are comprised of dichloromethane, present in ranges from 75% to 85% by weight, methanol in ranges from 6% to 15%, either butanol or cyclohexane in ranges of from 5% to 10%, and acetone in ranges of from 0% to 3%. This dope solution is pumped under a pressure of 7 to 50 atmospheres through a heater where it is heated to a temperature of from about 15° C. to about 40° C. and then through a fine filter where particles and slugs of gelatinous material are removed. The filtered dope stream still under the indicated pressure and within the temperature range indicated is then pumped into a conventional casting die, where the flow pattern of the material is transformed from cylindrical to rectangular in preparation for casting the web onto the casting surface.

At a time between 0.04 and 6 seconds before the dope stream exits the die lip, liquid solvent is injected at the extreme edge of the rectangular die so that the short sides of the rectangular casting surface are coated with liquid solvent. This liquid forms a boundary layer around the edge of the dope, encapsulating the edge of the dope stream, thereby denying contact between the cellulose acetate dope solution and the metal of the die. Thus a "slip layer" is formed which reduces the viscous drag between the dope and the metal wall of the die. This reduction in viscous drag keeps the shape of the edge intact as the dope stream exits the die. The liquid may be a solvent, such as dichloromethane, a stripping agent such as methanol, ethanol, butanol, isopropanol, or toluol, or a combination thereof, and is injected at a rate of between about 0.5 cc/minute to about 50 cc/minute at a temperature of between 0° C. and 40° C. In a preferred method, the flow of solvent is between 2–5 cc/minute at a temperature of between 25° C. and 35° C., and is injected between 0.1 and 0.5 seconds before the material leaves the die lip. The most preferred condition calls for injection of the liquid into the material 0.15 to 0.25 seconds before the material leaves the die lip. It is preferred that the angle of injection between the solvent and the dope flow not exceed 90°, as this may be destructive to the integrity of the boundary layer.

In the FIGURE, casting hopper 11 includes a cellulose triacetate dope inlet 13, a laterally extending expansion zone 15 and a sheet-forming die zone 17 which terminates in an exit port or orifice 19. The exit port or orifice 19 has upper and lower surfaces 21 and 23 respectively and edge surfaces 25 and 27. The upper and lower surfaces 21 and 23 and edge surfaces 25 and 27 extend the length (flow direction) of the sheet-forming die zone 17. Solvent inlets 29 and 31 are provided in the wall of the hopper in order that the solvent can be introduced into the cellulose triacetate dope solution prior to the exit of the dope solution from exit port 19. These solvent inlets 29 and 31 are connected via piping 33 and 35 respectively to pump means 37 and 39 respectively to deliver the required amount of solvent to the cellulose triacetate dope solution. While two pumps 37 and 39 are shown, one pump connected with suitable conduit means may be employed in order to deliver the solvent to the two edge surfaces of the sheet-forming die zone.

The invention is further illustrated by the following examples.

EXAMPLE 1

(Comparative)

A 20–35 percent by weight solution of cellulose triacetate in dichloromethane-methanol-butanol (90/5/5) is pumped through an extrusion die to form a film. No method is used to control the drying of the edge as it travels from the hopper lip to casting surface. As a result, with time, solid material builds up on the hopper lip, thus causing a disturbance to the coating and a formation of the edge that curls and does not convey well through the remainder of the machine. As the solid material on the lip grows in size, it eventually breaks free causing detrimental effects in the conveying portion of the machine.

EXAMPLE 2

(Comparative)

The process of Example 1 is repeated with the addition of an edge control scheme that provides either a solvent vapor and air mixture, or liquid solvent to the edge external to the die. In the case of solvent vapors, condensation occurs on the hopper lip causing liquid drops to fall on the web. This is detrimental to the process in that sticking to the casting surface occurs in areas where the drops contact the web. In the case where liquid is applied directly to the edge, difficulty in controlling uniformity of the flow of liquid to the edge occurs due to surface forces that require a drop formation before flow will occur, resulting in periodic drips of solvent that cause sticking. In addition, wetting of all surfaces of the edge is difficult resulting in nonuniform drying of the edge.

EXAMPLE 3

(Invention)

The process of Example 1 is repeated with the addition of an edge control scheme that provides a liquid flow of dichloromethane solvent along the edge of the die which originates at a time of 0.2 seconds before the dope leaves the hopper lip, as shown in the FIGURE. Uniform flow of the solvent is achieved through the action of the dope stream flow along the outlet of the solvent line within the die. No periodic dripping of solvent occurs and no sticking problems are encountered.

What is claimed is:

1. A method of making a cellulose triacetate photographic film support by forming a dope solution of cellulose triacetate in a first solvent, passing the dope solution under pressure through a sheet forming die zone having an upper and lower surface and two edge surfaces, injecting a second solvent into the dope solution at the edge surface within the die zone in an amount sufficient to form a slip layer at the two edge surfaces, exiting the dope solution from the sheet forming die zone and separating the solvent from the cellulose triacetate.

2. The method of claim 1 wherein the second solvent is injected into the dope solution at a temperature of from 0° to 40° C.

3. The method of claim 1 wherein the second solvent is injected into the dope solution at a time of from 0.04 to 6 seconds before the dope solution exits the sheet forming die zone.

4. The method of claim 1 wherein the dope solution exits the sheet forming die zone at a rate of 0.5 to 50 cc/min.

5. The method of claim 1 wherein the first solvent and the second solvent are the same.

6. The method of claim 1 wherein the first solvent is dichloromethane.

7. The method of claim 1 wherein the first solvent is a mixture of dichloromethane, methanol and n-butanol.

8. The method of claim 1 wherein the first solvent also includes a plasticizer.

9. The method of claim 8 wherein the plasticizer is triphenyl phosphate or dibutyl phthalate.

10. The method of claim 1 wherein the second solvent comprises dichloromethane.

11. The method of claim 5 wherein the first and second solvents comprise dichloromethane.

* * * * *